May 27, 1924.
F. E. DONHAM ET AL
1,495,892
RIM
Filed March 15, 1921   2 Sheets-Sheet 1
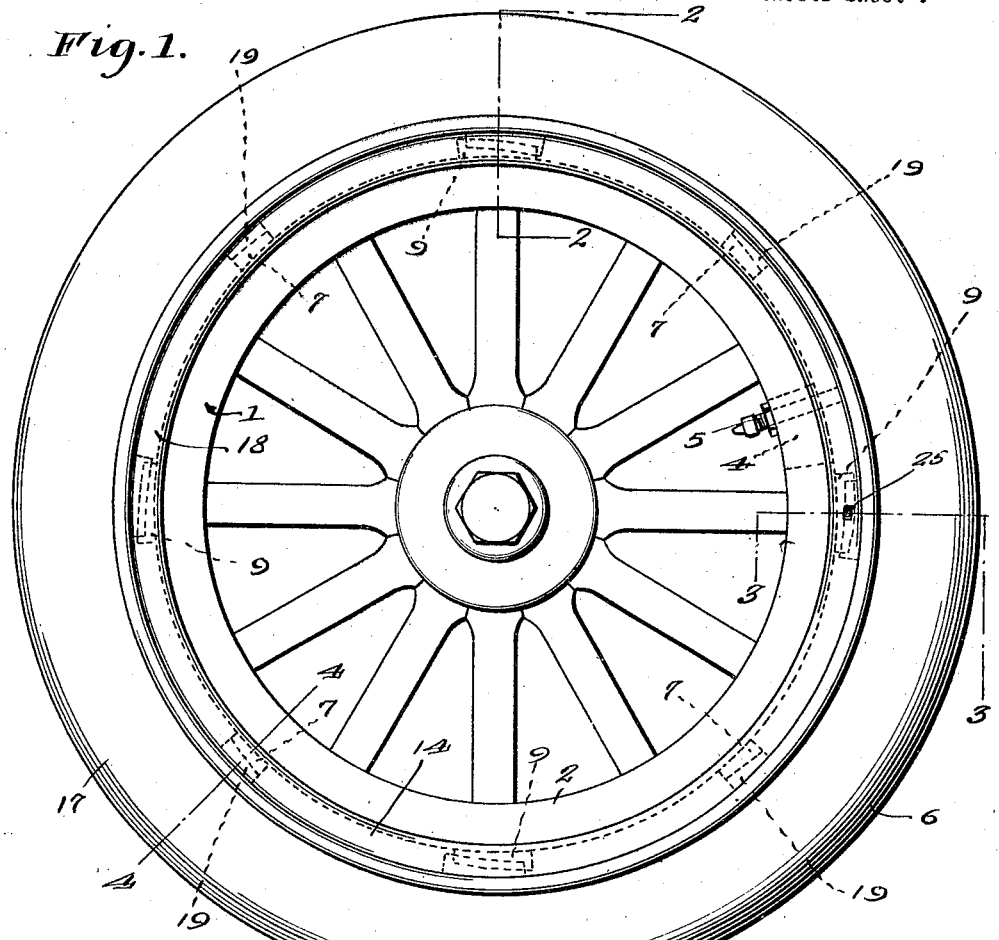
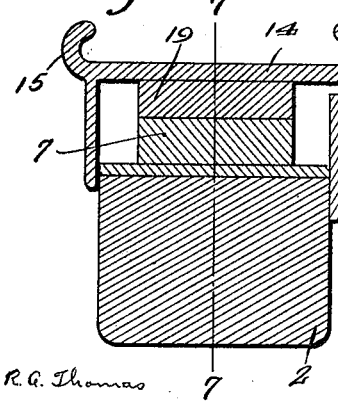
F.E.Donham
J.Albrecht   INVENTORS
BY *Victor J. Evans*
WITNESSES   ATTORNEY

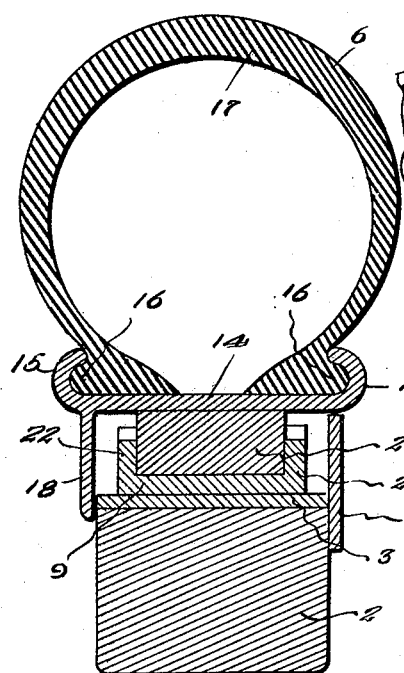
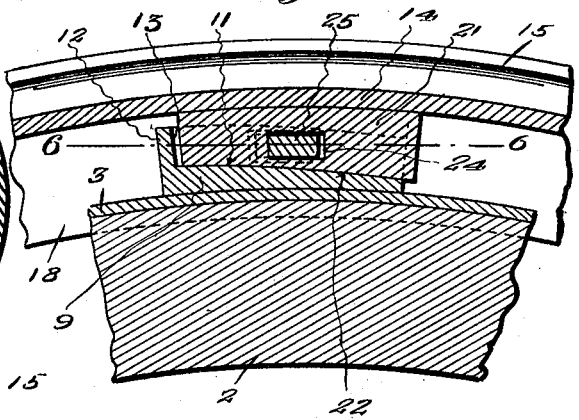
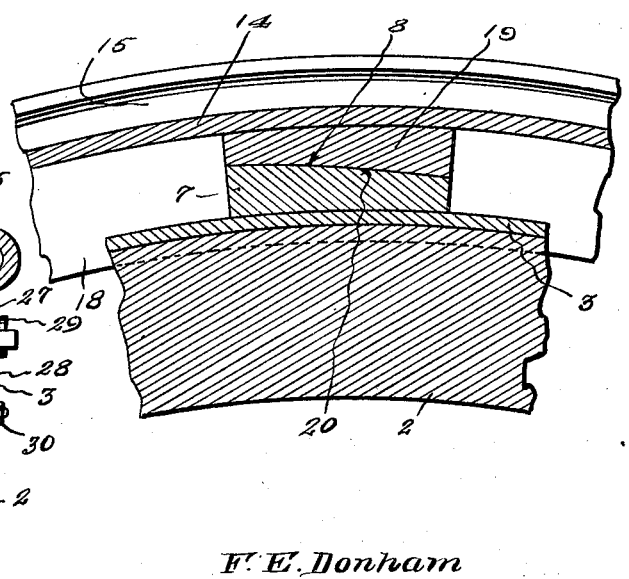

Patented May 27, 1924.

1,495,892

UNITED STATES PATENT OFFICE.

FREDERICK E. DONHAM AND JOHN ALBRECHT, OF ROSEVILLE, CALIFORNIA.

RIM.

Application filed March 15, 1921. Serial No. 452,460.

*To all whom it may concern:*

Be it known that we, FREDERICK E. DONHAM and JOHN ALBRECHT, both citizens of the United States, residing at Roseville, in the county of Placer and State of California, have invented new and useful Improvements in Rims, of which the following is a specification.

The present invention has reference to a demountable rim for vehicle wheels.

The object is the production of a demountable rim which is provided with means that cooperate with means on the wheel rim in a manner to hold the tire carrying rim away from the wheel rim except at such engaging points, whereby the resiliency of the tire carrying rim is not materially interfered with, while a single locking element is employed for holding the tire carrying rim on the wheel to prevent either lateral or circumferential movement of the said tire carrying rim with respect to the wheel.

A further object is to provide the rim of a wheel with lugs having angle faces and to provide the under face of the tire carrying rim with similar lugs designed, when the said tire carrying rim is turned circumferentially to effect a wedging engagement between its lugs and the lugs of the wheel tire, one of the wheel rim lugs being provided with a pocket to receive therein one of the tire carrying rim lugs, while means pass through these lugs, through a flange on the tire carrying rim and through a covering ring on the opposite side of the wheel for locking the elements together and for preventing either side or circumferential movement of the tire carrying rim on the wheel rim.

The foregoing, and other objects which will appear as the nature of the invention is better understood, may be accomplished by a construction, combination and operative association of parts, such as is disclosed by the drawings which accompany and which form part of this application.

In the drawings:—

Figure 1 is a side elevation of a wheel having a pneumatic tire supported thereon in accordance with this invention, parts broken away and parts being in section.

Figure 2 is an enlarged sectional view approximately on the line 2—2 of Figure 1.

Figure 3 is a similar sectional view approximately on the line 3—3 of Figure 1.

Figure 4 is a similar sectional view approximately on the line 4—4 of Figure 1.

Figure 5 is a sectional view approximately on the line 5—5 of Figure 3.

Figure 6 is a sectional view approximately on the line 6—6 of Figure 5.

Figure 7 is a sectional view approximately on the line 7—7 of Figure 4.

Referring now to the drawings in detail, an ordinary vehicle wheel is broadly indicated by the numeral 1. The wheel has the usual spokes radiating from its hub and connected to its felly 2, while on the felly there is secured the usual fixed rim 3. The felly is provided with an elongated opening 4 for the reception therethrough of the valve stem 5 which is connected to the inner tube of the tire casing 6.

On the fixed rim 3, at equi-distantly spaced intervals there are secured, in any desired or preferred manner, outstanding lugs 7. These lugs are of a less width than that of the fixed rim, and have their side faces disposed equi-distant from the edges of the rim. The outer face of each of the lugs is arranged at an inclination, as indicated by the numeral 8. Thus each lug 7 is wider at one of its ends than at its other end. One of the lugs which, in the drawings, is indicated for distinction by the numeral 9, is formed with a substantially rectangular pocket that enters from one end of the said lug. The side walls provided by the pocket are disposed at an inward angle with respect to each other, the end wall 12 being straight and the lower wall 13 being arranged at an angle. This construction provides a rim with a wedge pocket.

The tire carrying rim, which surrounds the wheel rim, is indicated by the numeral 14. This rim has its edges rounded upon itself to provide beads 15 that receive therein the beads 16 formed on the edges of the tire casing 17. The rim 14, on one of the edges thereof is integrally formed with an inwardly extending flange 18.

On the inner face of the rim 14 there are formed depending lugs 19. These lugs are of a width and length corresponding with the lugs 7. The lugs 19 have their under faces arranged at a pitch or inclination in a direction opposite to the surfaces 8 of the lugs 7. The inclined faces of the lugs 19 are indicated by the numeral 20, and when the tire carrying rim is arranged to surround the wheel rim, the lugs 19 of the same are first disposed between the lugs of the wheel rim, and thereafter the tire carrying rim is turned circumferentially on the wheel so that a wedging engagement is afforded between the contacting beveled or inclined faces 8 and 20 of the lugs 7 and 19 respectively.

One of the lugs, on the tire carrying rim is of a greater thickness than the remaining lugs, and is indicated for distinction by the numeral 21. This lug has its under face arranged at an inclination, as indicated by the numeral 22, and the said lug is of a width to be received in the pocket 13 in the lug 9. The side walls 22 of the lug 9 are provided with aligning substantially rectangular openings 23, while the lug 21 has a transverse wedge shaped slot 24 therethrough. When the lugs are associated, as above described, a wedge pin 25 is passed through an opening 26 in the flange 18 and through the openings 23 and 24. This wedge pin also passes through a wedge slot 27 in a flat ring member 28 that is disposed against the face of the felly 2, opposite that contacted by the flange 18. Suitable means, such for instance as a cotter pin 29 passes through the wedge pin and engages with the ring 28 for holding the latter against the felly, but in addition to this, other removable means 30 are employed for sustaining the said ring on the felly.

It is believed that the foregoing description, when taken in connection with the drawings will fully set forth the construction and advantages of the improvement to those skilled in the art to which such inventions relate, but it is to be understood that the showing and description refer only to a satisfactory embodiment of the improvement, and that such changes may be made therefrom as fall within the scope of what is claimed.

Having thus described the invention, we claim:—

In combination with a wheel having a rim on its felly, of a plurality of outstanding lugs spaced on the rim at equi-distant intervals and the outer face of each lug being arranged at an inclination thereby making one end wider than the other, an end wall and side walls formed on one of said lugs, said side walls being provided with aligned substantially rectangular openings and being disposed at an inward inclination with respect to each other to engage the end wall thereby constituting a wedge pocket, a tire carrying rim designed to surround the wheel rim, a plurality of depending lugs having their under faces arranged at an inclination in a direction opposite to the inclination of the outstanding lugs and being adapted to frictionally engage the outstanding lugs with the inclined faces contacting, one of said depending lugs being provided with a transverse wedge shaped slot designed to register with the aligned openings of the side walls, a wedge pin adapted to pass through the slot and aligned openings respectively and means associated with the pin to prevent a casual displacement thereof.

In testimony whereof we affix our signatures.

FREDERICK E. DONHAM.
JOHN ALBRECHT.